March 31, 1959 W. W. PHARIS 2,880,276

CONFERENCE CIRCUIT

Filed April 5, 1954 4 Sheets-Sheet 1

INVENTOR
WILLIAM W. PHARIS
BY
Francis E. Blake
ATTORNEY

INVENTOR
WILLIAM W. PHARIS
BY
Francis E Blake
ATTORNEY

CONFERENCE CIRCUIT

Filed April 5, 1954 4 Sheets-Sheet 3

INVENTOR
WILLIAM W. PHARIS
BY
[signature]
ATTORNEY

March 31, 1959 W. W. PHARIS 2,880,276

CONFERENCE CIRCUIT

Filed April 5, 1954 4 Sheets-Sheet 4

INVENTOR
WILLIAM W. PHARIS
BY
Francis E Blake
ATTORNEY

United States Patent Office 2,880,276

Patented Mar. 31, 1959

2,880,276

CONFERENCE CIRCUIT

William W. Pharis, Rochester, N.Y., assignor, by mesne assignments, to General Dynamics Corporation, a corporation of Delaware Application April 5, 1954, Serial No. 420,779

4 Claims. (Cl. 179—18)

This invention relates to telecommunication systems and particularly to means in a telephone system for establishing a conference connection.

The object of the invention is to provide means for simultaneously summoning a preselected plurality of subscribers whose stations are either idle or busy and to render such stations immediately connectible to a common or conference circuit.

In accordance with the present invention a conference circuit with which a preselected number of stations are permanently associated may be triggered for a predetermined period of time and a signal transmitted to each of said stations. During this period any idle station which responds is immediately connected to the conference circuit without any other act on the part of the subscriber thereat than the ordinary act of answering a call. Also during this period any busy station which abandons a connection in which it may be engaged and then answers the conference call signal in the ordinary manner will be immediately connected to the conference circuit.

A subscriber on a conference circuit line who ignores the summons to a conference and refuses to abandon a call in which he is engaged will be left undisturbed except for the slight annoyance caused by the summoning signal during the trigger period. However, when he does abandon the call in which he is engaged, his bell will immediately begin to ring as soon as his line is freed if the conference is still in progress. Again, a subscriber who has started to make a call just before the conference circuit is triggered, may complete such call if he is willing to ignore the summons to the conference during the trigger period.

A feature of the invention is a conference circuit network having a preselected plurality of stations permanently associated therewith and having means responsive to the approach thereto by a particular one of said stations for triggering said circuit network into an active condition for a predetermined period. Any one or more of said stations responding within said period may maintain the established conference connections for an indefinite period thereafter. If no one of the conference lines responds during the trigger period, the conference circuit times out and is returned to normal.

Another feature of the invention is a circuit delay element for preventing the ringing of any one of the conference stations when and if the conference circuit is triggered for less than a predetermined time. There may be a circuit condition set up in which the conference circuit is triggered for a very short period which does not actually represent an attempt to set up a conference call, so this circuit delay element will prevent the ringing of any conference circuit station.

Within the conference call circuit, means is provided to operate and lock in a relay for each idle station during the trigger period. If during this period any one or more of the stations respond then this locking circuit will be maintained until the conference is over and every station has left the connection.

Within the conference call circuit another means is provided to operate and lock in a relay for each station which responds so that the bell at such station will cease to ring. Thereafter, if the party leaves the conference before it is over his bell will not ring again, but his line will still be connected to the conference circuit so that should he lift his telephone before the conference is over, he will again be added to the conference.

A feature of the invention is a circuit arrangement whereby every subscriber whose station is associated with the conference circuit will be exclusively held to the conference arrangement until the last party in the conference has withdrawn. The only exception to this is the case of a subscriber who has an established connection already in existence, including a call already extended to his line though perhaps not answered as yet.

Other features will appear hereinafter.

The drawings consist of four sheets having six figures, as follows.

Figures 1, 2, 6:
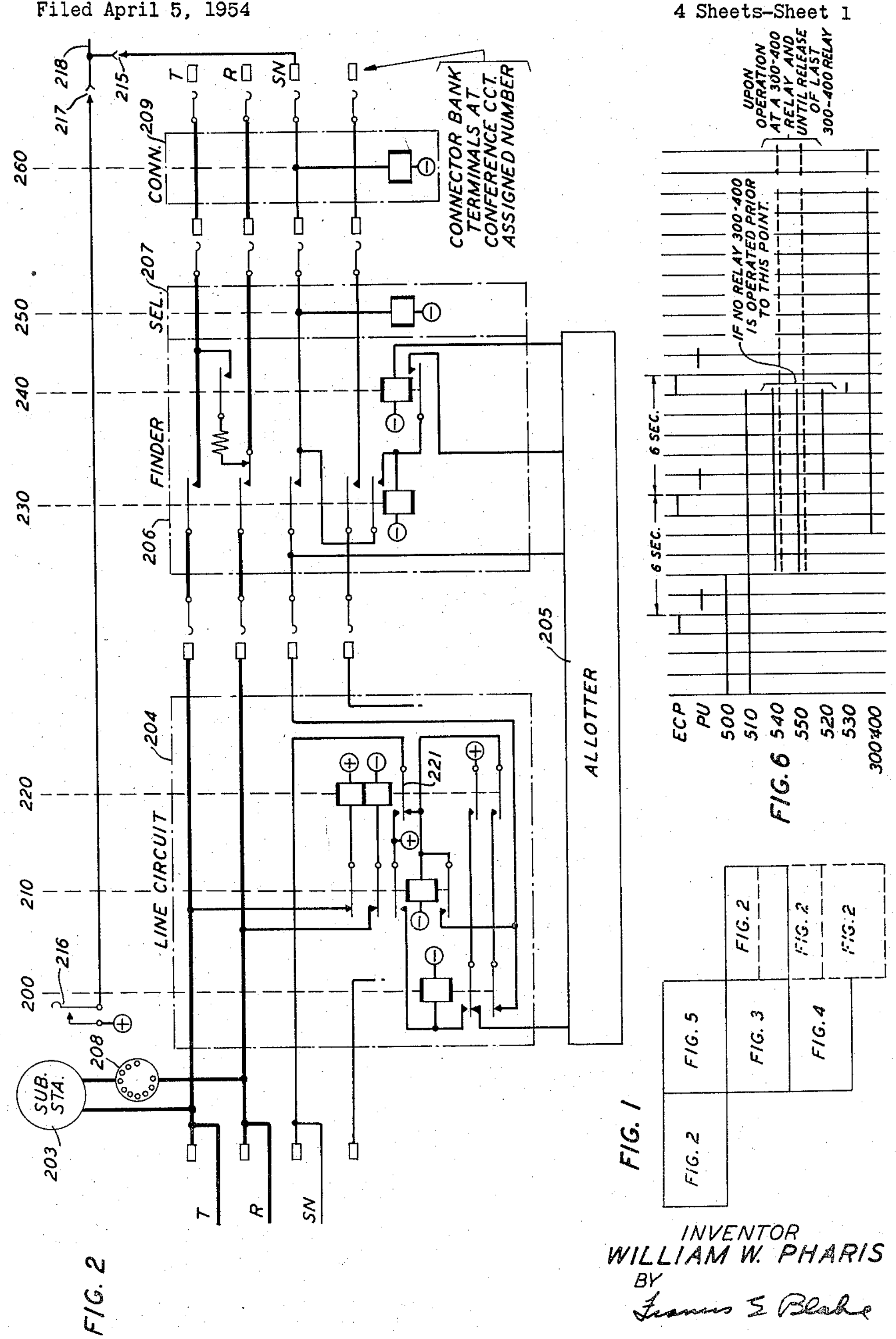
Fig. 1 is a block diagram showing how Figs. 2, 3, 4 and 5 may be placed to provide a schematic circuit diagram illustrating the present invention.
Fig. 2 is a circuit diagram of a telephone substation connected to its conventional line circuit, a finder, selector, and connector, by which a connection to the connector bank terminals assigned to the conference circuit may be reached.
Fig. 6 is a time chart with the aid of which the operation of the circuit may be explained.

There will be in this conference circuit network a total of up to eight substations permanently associated therewith, any one of which may trigger the conference circuit by setting up a conventional connection to the conference circuit assigned number then hanging up and finally lifting the telephone from its cradle. The substation 203, in making a call in the usual way, operates the conventional line circuit 204, whereupon the allotter 205 will start the finder 206 to pick up the calling line and extend it to the selector 207. Thereupon the subscriber at the substation 203, through the operation of his dial 208, may cause the selector to pick out the connector 209 and extend the connection thereby to the set of terminals labeled "connector bank terminals at conference circuit assigned number." By conventional means the SN terminal will be grounded when the connector 209 sets its brushes on this set of terminals. Thereupon the ground on the SN terminal, assuming the connection 215 to be completed, will extend through the armature 541 and back contact of relay 540, thence through the winding of the relay 500, to battery, so that the relay 500 becomes operated. Alternatively, a manual key 216 may be supplied at a given one of these substations, such as the substation 203, and the connection 217 may be completed instead of the connection 215 so that by the operation of the key 216, the same result will be obtained, that is, relay 500 will be operated. Upon the operation of this relay a circuit will be extended from armature 501 and its front contact, the winding of relay 510, to battery, so that this relay operates and immediately locks in a circuit from ground, armature 531 and its back contact, armature 511 and its front contact to the winding of the relay 510. If now the subscriber at substation 203 hangs up so that the connector 209, the selector 207 and the finder 204 release and return to normal, or, alternatively, if this subscriber releases the key 216, the relay 500 will release. Upon the release of relay 500, the armature 501 will return to its back contact and extend a connection from ground through the armature 512 and its front contact through the winding of the relay 540 to battery, so that this relay operates. Through the armature 542 a connection is made to the winding of relay 550 resulting in the operation of this relay. Through its armature 543 a ground is extended to the common supervisory circuit to activate this conventional means. One of the results of this will be the starting of an interrupter which will thereupon send out pulses over the PU conductor 502 and ECP conductor 503 which are depicted in their time sequence in Fig. 6. The starting of the common supervisory circuit will also cause generator current to be applied to the conductor 504.

Figure 3:
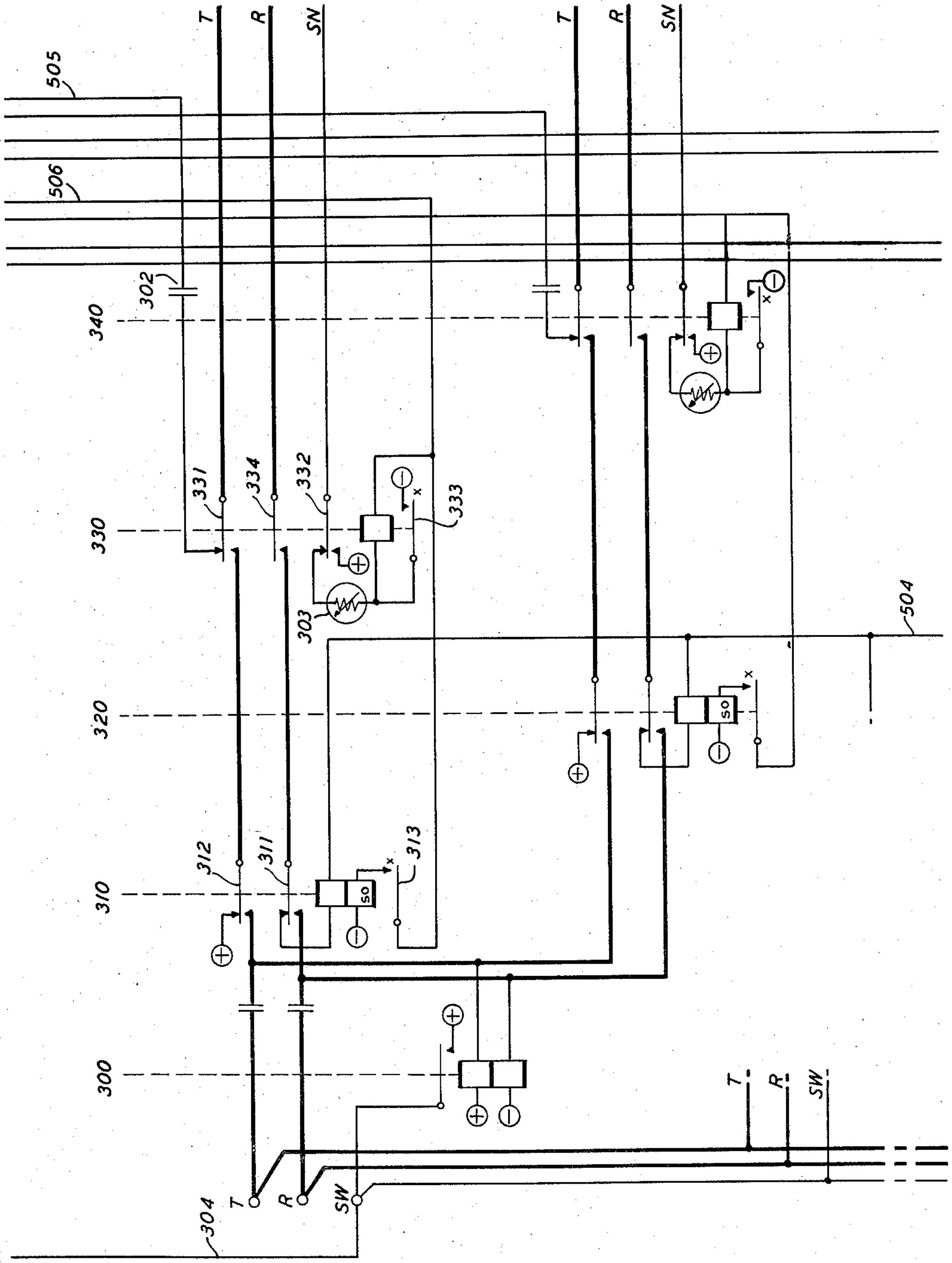
Fig. 3 is a schematic circuit diagram showing the connections within the conference circuit to two substations permanently associated therewith.
Figure 4:
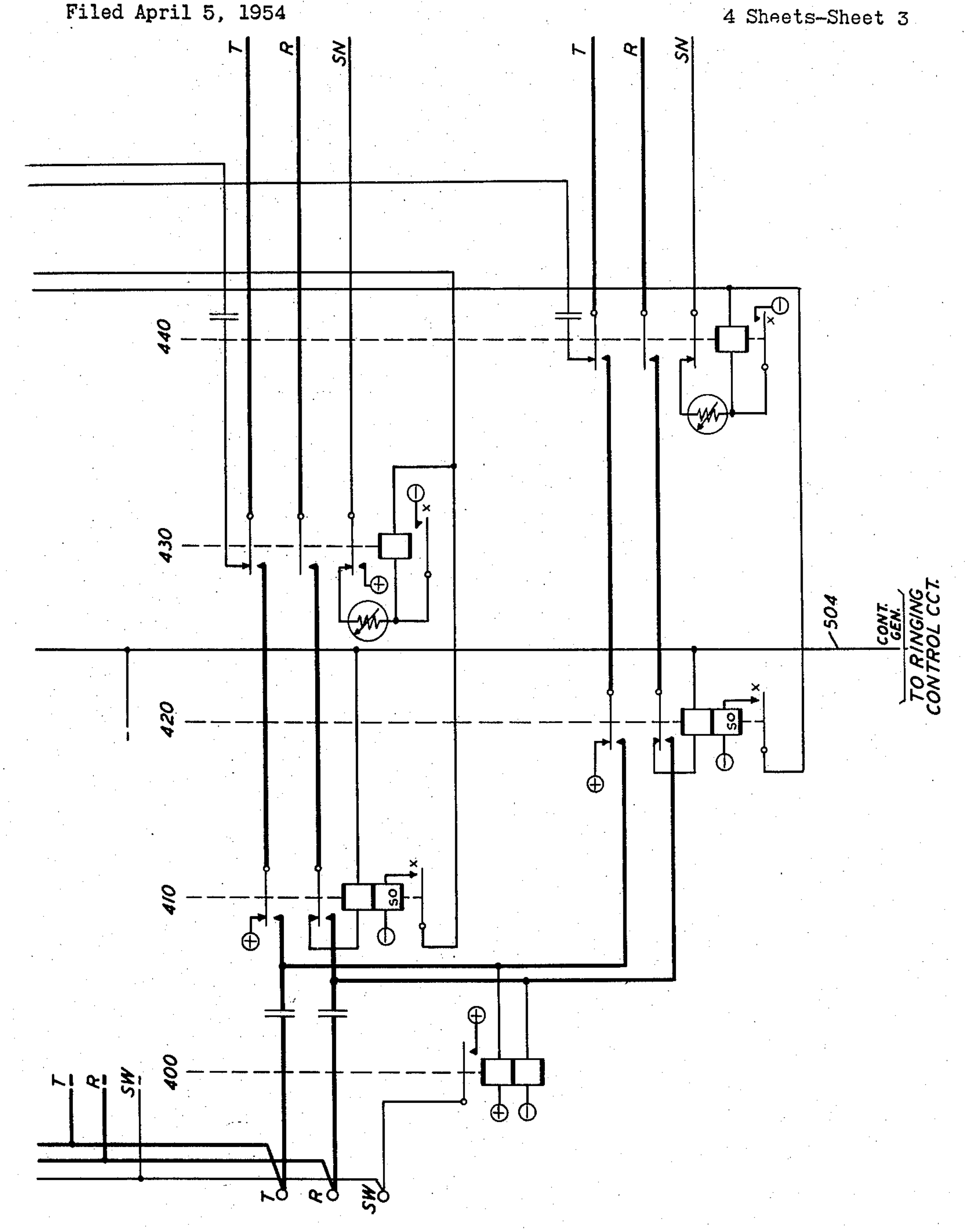
Fig. 4 is a similar diagram for two other permanently associated substations.
Figure 5:
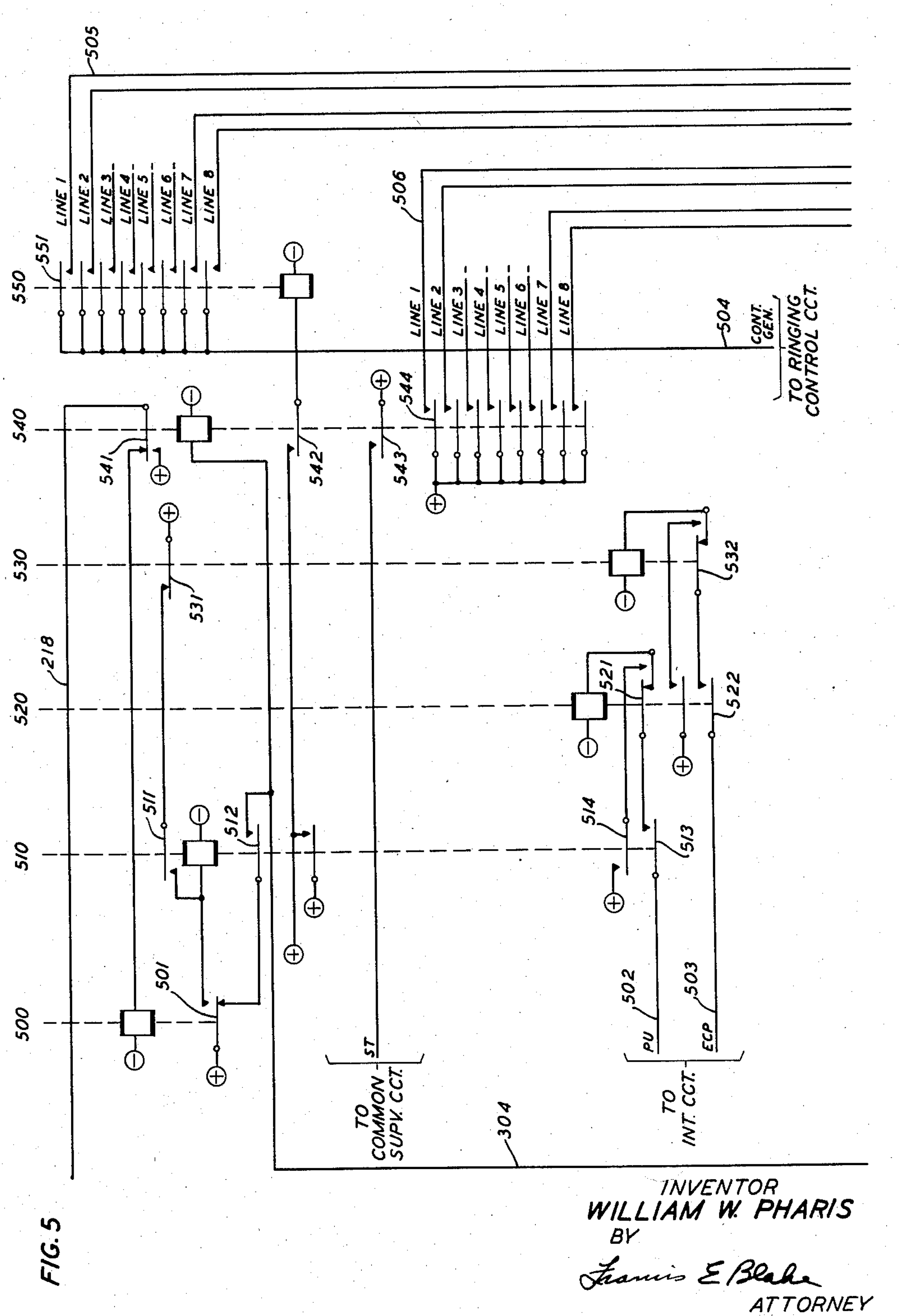
Fig. 5 is a circuit diagram showing the common connections within the conference circuit for controlling the operation thereof.

Through its armature 551 and front contact the relay 550 will extend generator current to the conductor 505, thence through the condenser 302, the back contact and armature 331 of the relay 330 to the tip conductor of the line extending to the first substation permanently associated with this conference circuit. This will apply a tone signal to the line of this called station so that if the called station is busily engaged in a connection, this warning tone will be given to the subscriber thereat. If the line, however, is idle, this tone will not be heard. At the same time, however, through the armature 544 of relay 540, ground will be extended to conductor 506, thence through the winding of relay 330, the thermister 303, the back contact and armature 332, thence over the SN conductor to the line circuit of the called station through the armature 221 and its back contact thereat and thence through the winding of the cut off relay 210 to battery. This will cause a current to flow which at first will be insufficient to operate either the relay 330 or the cut off relay 210. However, the current flowing through the thermister 303 will cause this element to heat so that in a short time its resistance will become lowered sufficiently to operate both these relays. Thereupon the relay 330 will operate and lock through its armature 333 and front contact. Upon the operation of this relay the ringing current on conductor 504, shown also in Figs. 3 and 4, will be extended through the upper winding of relay 310, back contact and armature 311, front contact and armature 334, the ring of the line through the substation 203, thence back over the tip of the line, armature 331 and its front contact, armature 312 and its back contact to ground. Relay 310 is thus a ringing trip relay which responds when the called substation answers. At this time the ringing trip relay 310 will lock through its lower winding, its armature 313, to the ground on conductor 506. Through its armatures 311 and 312, the line to the called substation 203 is extended to the windings of the answer bridge relay 312, through which talking battery is supplied to the called line. Upon the operation of relay 300 ground is extended to conductor 304, whereby the relay 540 will be maintained operated thereafter independent of the relay 510 and until the last subscriber assigned to the conference circuit has hung up. Therefore the relay 540 will be maintained in operation throughout the duration of the conference.

It will be noted that when ground is extended to the conductor 506 to the winding of the relay 330 that if the called substation 203 is busy its sleeve wire will be grounded so that no current will flow through the relay 330. This relay is thus effectively short circuited. Therefore the ringing tone transmitted through the condenser 302 will be continuously transmitted to such busy called subscriber so that he will be notified that a conference has been called. This subscriber may, of course, ignore this ringing tone and continue on with his own conversation. However, since his instructions are to abandon such call, he will do this as soon as he can find it convenient. Thereupon as his line circuit returns to normal the battery connection through the winding of the cut off relay 210 will be established so that the relay 330 in series with the thermister 303 will be established to cause the operation of the relay 330 in the manner hereinbefore described. Thereupon this called subscriber will be rung in the manner above described.

The other subscribers permanently associated with this circuit will be signaled in the same manner. As each such subscriber answers and joins the conference, the ringing tone through the back contact of the relay 330 and so forth, and the ringing current through the upper winding of the ringing trip relay and so forth, will be disconnected.

Looking at the time chart, Fig. 6, it will be noted that first the relay 500 will be operated and will cause the immediate operation and locking of the relay 510. Thereupon, as the relay 500 is released it will cause the operation of the relays 540 and 550. If thereafter the subscriber at the calling station or any other of the subscribers assigned to the conference circuit fail to answer to perfect or enable the conference circuit, it will time out as indicated. That is, upon the first pick up pulse over the conductor 502 after the release of the relay 500, the first counting relay 520 will respond in a circuit from conductor 502, armature 513 and its front contact, armature 521 and its back contact, and thence through the winding of the relay 520 to battery. This relay immediately locks through the alternate contacts of its armature 521 through the armature 514 of the relay 510 to ground. Following this the circuit for the ECP pulse over conductor 503 is established through the armature 522 and its front contact, the armature 532 and its back contact, through the winding of the relay 530 so that upon the following pulse over the conductor 503 this second counting relay 530 will operate. If by this time no one of the relays 300 or 400 has operated, then the conductor 304 will not be grounded and since the relay 530 opens the holding circuit of the relay 510, the relay 540 and consequently the relay 550, will be released. Thus, if the circuit has been triggered through the application of ground for an instant to the conductor 218 and no one of the substations included in this conference circuit network answers to cause the grounding of conductor 304, the circuit will time out.

If, however, any one of the relays 300 or 400 is operated by the answer of any one of the substations associated with this circuit, the result will be as depicted by the broken line associated with the relays 540 and 550 in Fig. 6. That is, upon the following ECP pulse over conductor 503, although the relay 510 is released, the conference will be maintained through the continued operation of relays 540 and 550. Upon the release of relay 510 the relays 520 and 530 will be released. It may be noted that in either case the operation of relay 530 is only of momentary duration.

Thus it will be apparent that any one of the subscribers associated with this conference circuit may trigger the conference circuit and he or any other one of the subscribers may thereupon enable the circuit by replying promptly to the ringing of his bell. Any subscriber who delays answering will be insistently summoned by the continuous application of ringing current to his line until he answers that summons.

What is claimed is:

1. In a telecommunication system, a conference circuit, a predetermined plurality of station lines associated with said circuit, means to trigger said circuit for a predetermined time interval, means operating during said predetermined time interval for transmitting a warning signal to each busy one of said plurality of lines, means initiated during said predetermined time interval for transmitting a calling signal to each idle one of said plurality of lines, means responsive to the answer of any idle one of said lines for holding said circuit enabled thereafter and means for releasing said circuit at the end of said time interval providing no one of said plurality of lines has answered or alternatively upon the release of the last one of said lines which have answered including at least one which has answered within said time interval.

2. In a telecommunication system, a conference circuit, a plurality of station lines permanently associated with said circuit, means to trigger said circuit for a predetermined time interval, means operative during said trigger period for enabling said circuit, means operating during said trigger period and thereafter during said following enablement for transmitting a warning signal to each busy one of said plurality of lines, means operative after said circuit has been enabled for removing said warning signal from each line making connection to said conference circuit and means operative after said circuit has been enabled for applying a call signal to each idle line of said plurality.

3. In a telecommunication system, a conference circuit, a plurality of station lines permanently associated with said circuit, push button means located adjacent to one or more of said conference circuit stations to trigger said circuit for a predetermined time interval, means operative during said trigger period for enabling said circuit, means operating during said trigger period and thereafter during said following enablement for transmitting a warning signal to each busy one of said conference lines, means operative after said circuit has been enabled for removing said warning signal from each line making connection to said conference circuit and means operative after said circuit has been enabled for applying a call signal to each idle line of said plurality.

4. In a telecommunication system, a conference circuit, a plurality of station lines permanently associated with said circuit, a set of contacts reached by dial controlled means to trigger said circuit for a predetermined time interval, means operative during said trigger period for enabling said circuit, means operating during said trigger period and thereafter during said following enablement for transmitting a warning signal to each busy one of said conference lines, means operative after said circuit has been enabled for removing said warning signal from each line making connection to said conference circuit and means operative after said circuit has been enabled for applying a call signal to each idle line of said plurality.

References Cited in the file of this patent

UNITED STATES PATENTS

| | | |
|---|---|---|
| 1,264,158 | Clausen | Apr. 30, 1918 |
| 1,554,999 | Gardner | Sept. 29, 1925 |
| 1,665,466 | Middleton | Apr. 10, 1928 |
| 2,040,308 | Hatton et al. | May 12, 1936 |
| 2,386,126 | Lomax | Oct. 2, 1945 |
| 2,443,945 | Bellamy | June 22, 1948 |
| 2,717,925 | Lomax | Sept. 13, 1955 |
| 2,787,663 | Pharis | Apr. 2, 1957 |